United States Patent
Hosokawa et al.

(10) Patent No.: US 10,339,444 B2
(45) Date of Patent: Jul. 2, 2019

(54) MONITORING POTENTIAL OF NEURON CIRCUITS

(71) Applicant: INTERNATIONAL BUSINESS MACHINES CORPORATION, Armonk, NY (US)

(72) Inventors: Kohji Hosokawa, Kawasaki (JP); Masatoshi Ishii, Kawasaki (JP); Atsuya Okazaki, Kawasaki (JP); Junka Okazawa, Kawasaki (JP); Takayuki Osogami, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/411,034

(22) Filed: Jan. 20, 2017

(65) Prior Publication Data

US 2018/0211159 A1 Jul. 26, 2018

(51) Int. Cl.
*G06N 3/04* (2006.01)
*G06N 3/063* (2006.01)

(52) U.S. Cl.
CPC ............ *G06N 3/063* (2013.01); *G06N 3/049* (2013.01); *G06N 3/0635* (2013.01)

(58) Field of Classification Search
None
See application file for complete search history.

(56) References Cited

U.S. PATENT DOCUMENTS

| 5,940,529 A | 8/1999 | Buckley |
| 8,962,304 B2 | 2/2015 | Huys et al. |
| 2014/0129498 A1* | 5/2014 | Bichler ................ G06N 3/049 706/25 |

(Continued)

FOREIGN PATENT DOCUMENTS

JP 2015510195 4/2015

OTHER PUBLICATIONS

Mayr, et al., "Multiple-Timescale Plasticity in a Neuromorphic System", Institute of Circuits and Systems, Technische Universitat Dresden, Germany, ISCAS, IEEE Explore, May 2013, 5 pages.

(Continued)

*Primary Examiner* — Fazli Erdem
*Assistant Examiner* — Scott R Wilson
(74) *Attorney, Agent, or Firm* — Tutunjian & Bitetto, P.C.; Vazken Alexanian

(57) ABSTRACT

A neuromorphic electric system includes a network of plural neuron circuits connected in series and in parallel to form plural layers. Each of the plural neuron circuits includes: a soma circuit that stores a charge supplied thereto and outputs a spike signal; and plural synapse circuits that supply a charge to the soma circuit according to a spike signal fed to the synapse circuits, a number of the plural synapse circuits being one more than a number of plural neuron circuits in a prior layer outputting the spike signal to the synapse circuits. One of the plural synapse circuits supplies a charge to the soma circuit in response to receiving a series of pulse signals, and the others of the plural synapse circuits supply a charge to the soma circuit in response to receiving a spike signal from corresponding neuron circuits in the prior layer.

9 Claims, 6 Drawing Sheets

(56) References Cited

U.S. PATENT DOCUMENTS

2014/0277718 A1* 9/2014 Izhikevich .............. B25J 9/163
                                                    700/250
2015/0061905 A1  3/2015 Kappes
2015/0294217 A1 10/2015 Aparicio, IV
2016/0125287 A1  5/2016 Pantazi et al.

OTHER PUBLICATIONS

Wu, et al., "Homogeneous Spiking Neuromorphic System for Real-World Pattern Recognition", IEEE Journal on Emerging and Selected Topics in Circuits and Systems, Jun. 2015, pp. 1-13, vol. 5, No. 2.

Frontiers, On SpikeTiming Dependent Plasticity, Memristive Devices, and Building a Self-Learning Visual Cortex, Neuromorphic Engineering, available at: http://journal.frontiersin.org/journal, lats downloaded Aug. 7, 2016, 32 pages.

U.S. Office Action issued in U.S. Appl. No. 15/802,975 dated Sep. 10, 2018, 9 pages.

\* cited by examiner

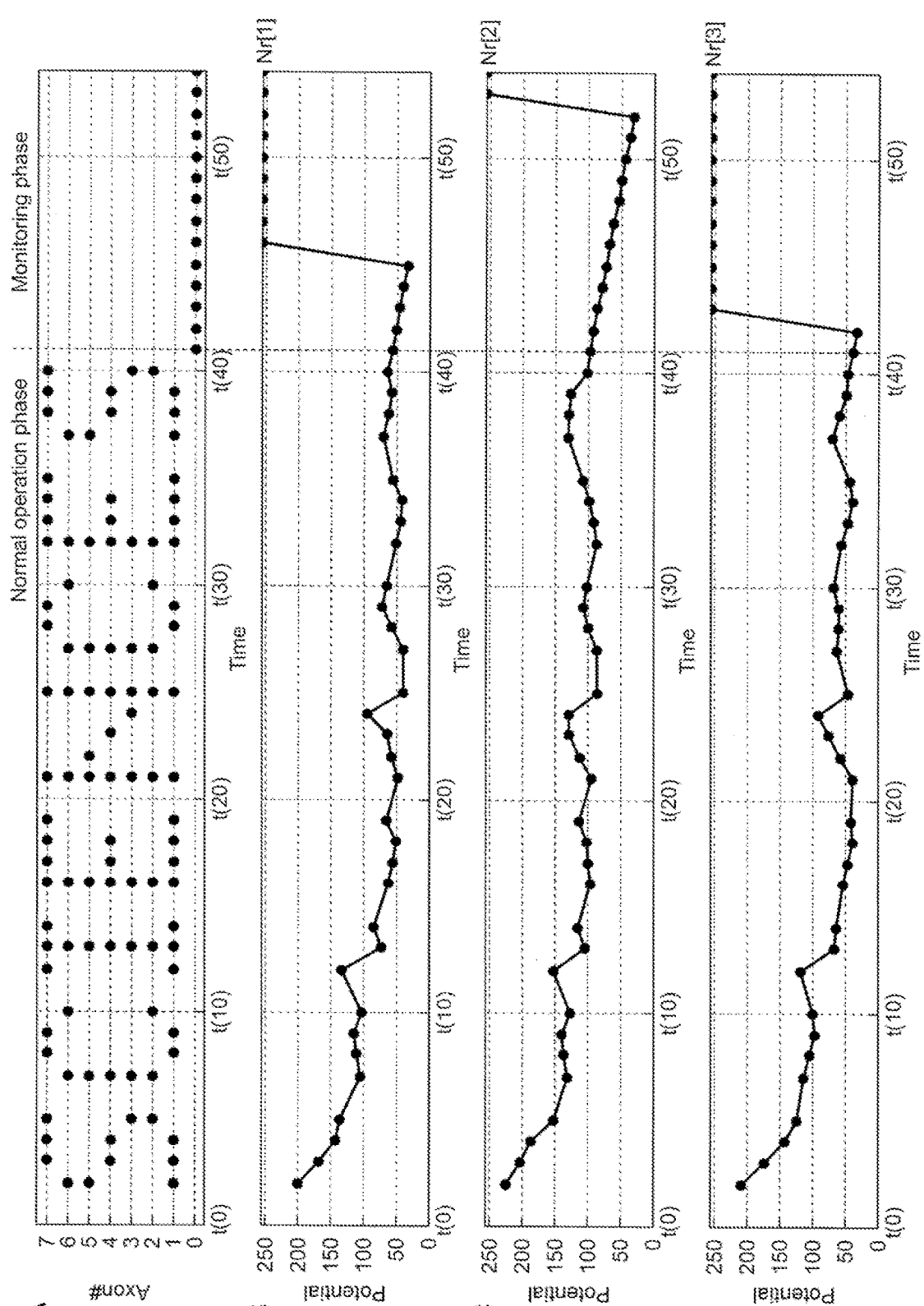

MONITORING POTENTIAL OF NEURON CIRCUITS

BACKGROUND

Technical Field

The present invention relates to monitoring membrane potential of neuron circuits.

Description of the Related Art

A spiking neural network (SNN) with analog neurons is one of the implementation models for neuromorphic electric systems. Monitoring the analog neuron's membrane potential (hereinafter referred to as a "neuron potential") itself is not mandatory requirement in the SNN because all information is transmitted or received as a "spike" in the SNN. However, monitoring the neuron potential is needed for checking behavior of the neurons in some cases such as debugging.

SUMMARY

According to an embodiment of the present invention, there is provided a neuromorphic electric system including a network of plural neuron circuits. The plural neuron circuits are connected in series and in parallel to form plural layers. Each of the plural neuron circuits includes a soma circuit and plural synapse circuits. The soma circuit is configured to store a charge supplied thereto and to output a spike signal if a neuron potential of the soma circuit caused by the stored charge exceeds a predetermined threshold. The plural synapse circuits are each configured to supply a charge to the soma circuit according to a spike signal fed to the synapse circuits. The number of the plural synapse circuits is one more than plural neuron circuits in a prior layer that output the spike signal to the synapse circuits. One of the plural synapse circuits is configured to supply a charge to the soma circuit in response to receiving a series of pulse signals. The others of the plural synapse circuits are configured to supply a charge to the soma circuit in response to receiving a spike signal from respective corresponding neuron circuits in the prior layer.

According to another embodiment of the present invention, there is provided a neuromorphic electric system including a network of plural layers each including plural input terminals and plural output terminals. Each of the plural layers is a fully-connected network in which the plural input terminals and the plural output terminals are connected to each other via plural resistor elements. The plural input terminals include plural general input terminals and one predetermined input terminal. The plural general input terminals receive input from respective corresponding output terminals in a prior layer. The predetermined input terminal is unconnected to any one of the plural output terminals in the prior layer. The predetermined input terminal receives input of a series of pulse signals. Each of the plural output terminals is connected to a circuit that stores a charge obtained from input from the plural input terminals via the plural resistor elements. The circuit outputs a spike signal to a subsequent layer as an output from a layer the circuit belongs to, if a neuron potential of the circuit caused by the stored charge exceeds a predetermined threshold.

According to yet another embodiment of the present invention, there is provided a method for monitoring a neuron potential in a neuromorphic electric system. The neuromorphic electric system includes a network of plural layers each including plural input terminals and plural output terminals. Each of the plural layers is a fully-connected network in which the plural input terminals and the plural output terminals are connected to each other via plural resistor elements. The plural input terminals include plural general input terminals and one predetermined input terminal. The plural general input terminals receive input from respective corresponding output terminals in a prior layer. The predetermined input terminal is unconnected to any one of the plural output terminals in the prior layer. Each of the plural output terminals is connected to a circuit that stores a charge obtained from input from the plural input terminals via the plural resistor elements. The circuit outputs a spike signal to a subsequent layer as an output from a layer the circuit belongs to, if a neuron potential of the circuit caused by the stored charge exceeds a predetermined threshold. The method includes feeding test data to the neuromorphic electric system to cause the system to perform a normal operation. The method further includes feeding a series of pulse signals from the predetermined input terminal to determine a number of pulse signals at a time when the circuit connected to each of the plural output terminals fires.

BRIEF DESCRIPTION OF THE DRAWINGS

The following description will provide details of preferred embodiments with reference to the following figures wherein:

FIGS. 4A to 4D illustrate a relationship of the input pattern fed to the input terminals and the neuron potential of the neuron circuit.

DETAILED DESCRIPTION

Hereinafter, exemplary embodiments of the present invention will be described in detail with reference to the attached drawings.

It is to be noted that the present invention is not limited to the exemplary embodiments to be given below and can be implemented with various modifications within the scope of the present invention. In addition, the drawings used herein are for purposes of illustration, and do not show actual dimensions.

Figure 1:
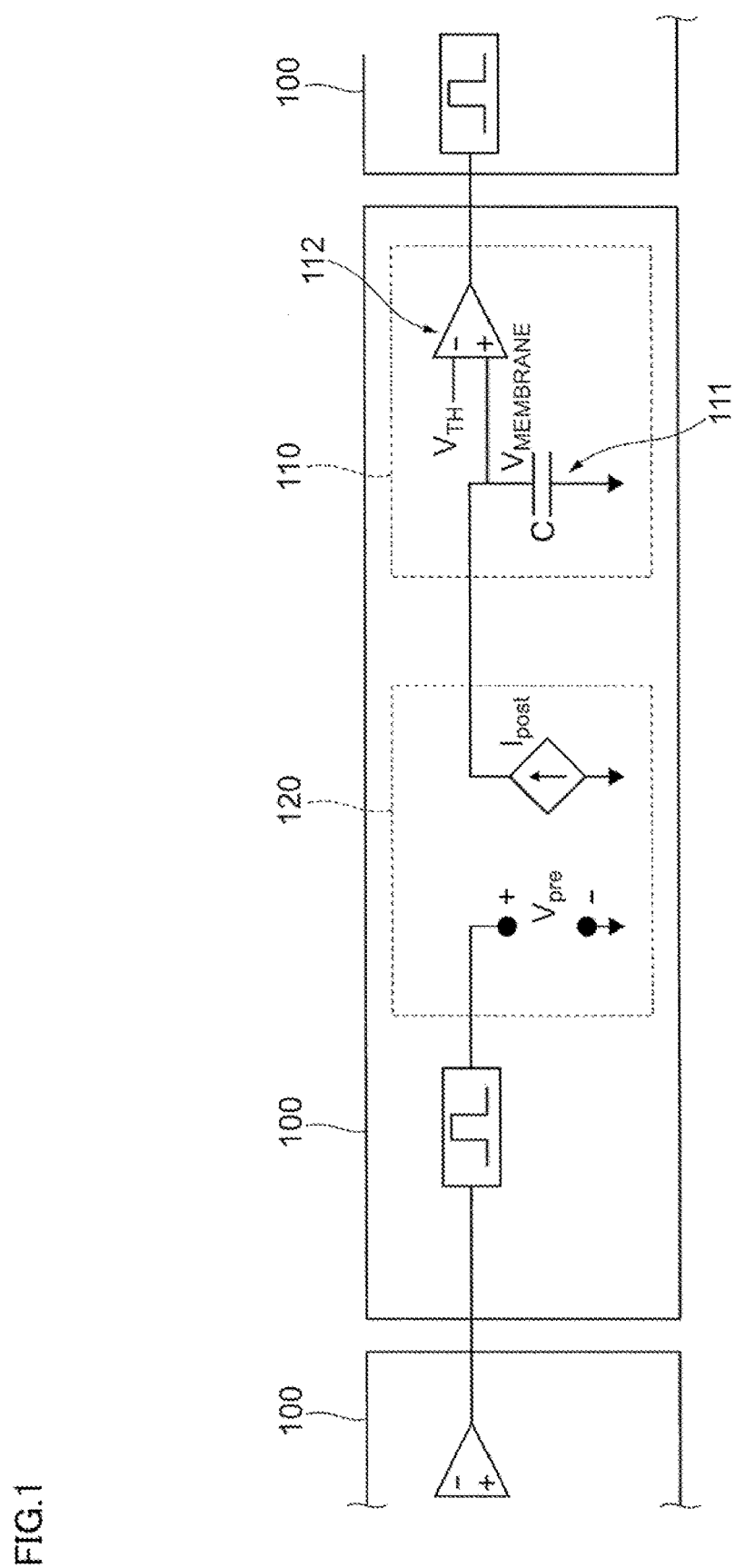
FIG. 1 shows an example of an integrate-and-fire circuit model for a neuromorphic electric system according to an exemplary embodiment.

FIG. 1 shows an example of an integrate-and-fire circuit model for a neuromorphic electric system according to an exemplary embodiment.

FIG. 1 illustrates neuron circuits 100 each corresponding to one neuron. As shown in the figure, a neuron circuit 100 located in the middle of the figure receives an action potential (spike) $V_{pre}$ from a prior neuron circuit 100. Each neuron circuit 100 can include a soma portion 110 and a synapse portion 120. The soma portion 110 is an example of a soma circuit, and the synapse portion 120 is an example of the synapse circuit. The figure shows an example where the action potential $V_{pre}$ is applied from one neuron circuit 100 to another one neuron circuit 100. However, an actual neuromorphic electric system is configured such that each of the multiple neuron circuits 100 applies the action potential $V_{pre}$ to one or more neuron circuits 100. Accordingly, one neuron circuit 100 can include multiple synapse portions 120 to receive the action potential $V_{pre}$ from multiple prior neuron circuits 100.

Note that the SNN constituting the neuromorphic electric system in the exemplary embodiment can be a multi-layer network of multiple neuron circuits 100 of FIG. 1 connected in series and in parallel to form multiple layers. The multiple neuron circuits 100 in each layer can be supplied with a charge from multiple neuron circuits 100 in a prior layer, so that the multiple neuron circuits 100 in that layer are applied with the action potential $V_{pre}$. Additionally, the multiple neuron circuits 100 in each layer can supply a charge, as an output from the network in that layer, to multiple neuron circuits 100 in a subsequent layer, so that the multiple neuron circuits 100 in the subsequent layer are applied with the action potential $V_{pre}$. In the foregoing description, supplying a charge to a neuron circuit 100 to make the neuron circuit 100 applied with the action potential $V_{pre}$ can be simply referred to as "outputting the action potential $V_{pre}$".

Upon receipt of the action potential $V_{pre}$ from the prior neuron circuit 100, the synapse portion 120 supplies a charge to the soma portion 110 on the basis of the received action potential $V_{pre}$. Here, each synapse portion 120 is assigned a unique weight (synaptic weight) w, and the charge $I_{post}$ supplied to the soma portion 110 is determined by the action potential $V_{pre}$ and the weight w. Accordingly, even when the same action potential $V_{pre}$ is applied from the prior neuron circuit 100, the charge $I_{post}$ supplied from the synapse portion 120 to the soma portion 110 generally varies according to the weight w assigned to each synapse portion 120.

In the exemplary embodiment, the synapse portion 120 can be a resistor element to which an analog value (multi-value) can be set as a resistance value. An inverse quantity of the resistance value, that is to say, a conductance value set to the resistor element (the synapse portion 120) can represent the weight w. Also, the resistor element used as the synapse portion 120 can be one whose resistance value can be variable. Examples of such resistor element can include a resistive random access memory (ReRAM). The ReRAM is a resistor element and can rewrite (store) the resistance value. Accordingly, the ReRAM can be used as the synapse portion 120 holding the variable weight w. The ReRAM used as the synapse portion 120 can supply the charge $I_{post}$ ($I_{post}=w\times V_{pre}$) to the soma portion 110 on the basis of the weight w as represented by the stored conductance value and the action potential $V_{pre}$ applied from the prior neuron circuit 100.

The soma portion 110 can include a capacitor 11 and a comparator 112. The capacitor 111 stores the charge $I_{post}$ supplied by the synapse portion 120. The comparator 112 compares the potential (membrane potential or neuron potential) $V_{MEMBRANE}$ caused by the charges incrementally stored in the capacitor 111 with a predetermined threshold $V_{TH}$. When the neuron potential $V_{MEMBRANE}$ exceeds the threshold $V_{TH}$, the comparator 112 outputs the action potential (spike) $V_{pre}$, in other words, the neuron circuit 100 fires. This action potential $V_{pre}$ is applied to a subsequent neuron circuit 100.

Figure 2:
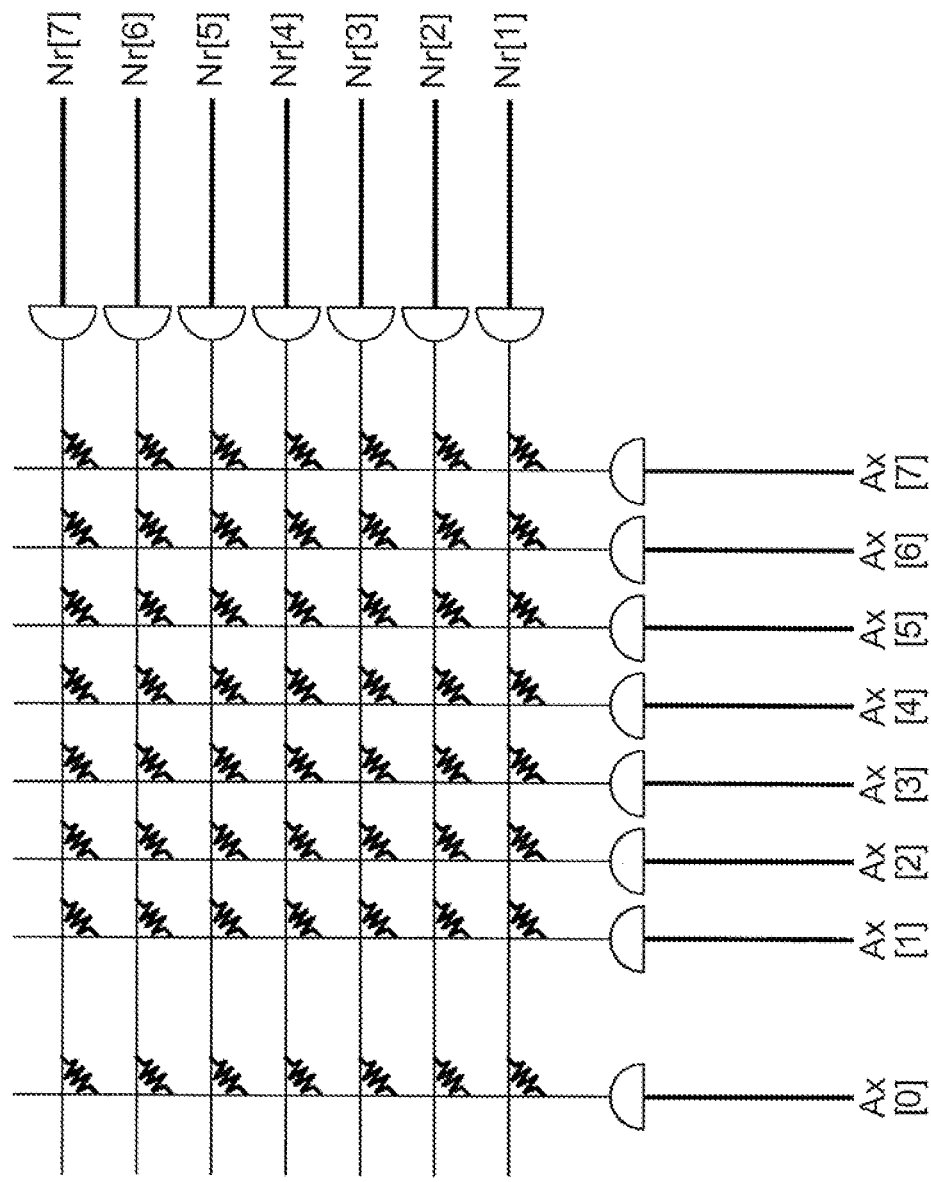
FIG. 2 shows an example of a network of neuron circuits in the neuromorphic electric system according to the exemplary embodiment.

FIG. 2 shows an example of a network of the neuron circuits 100 in the neuromorphic electric system according to the exemplary embodiment.

As shown in the figure, the network can include a fully-connected network of seven inputs and seven outputs with one additional input. Input terminals Ax [1] to Ax [7] are respectively connected to prior neuron circuits 100. On the other hand, an input terminal Ax [0] is not connected to any of the prior neuron circuits 100, and can receive a signal from the outside. Output terminals Nr [1] to Nr [7] are respectively connected to the soma portions 110 of the neuron circuits 100. The ReRAM constituting the synapse portion 120 of each neuron circuit 100 is arranged at each intersection of the lattice network shown in the figure. Accordingly, each soma portion 110 corresponding to one of the output terminals Nr [1] to Nr [7] is connected to each of the input terminals Ax [0] to Ax [7] via the ReRAMs each having a unique conductance value (weight w).

Note that the network shown in FIG. 2 is a part of the SNN constituting the neuromorphic electric system in the exemplary embodiment. More specifically, FIG. 2 schematically illustrates one layer among the layers in the multi-layer network constituting the SNN. That is, the input terminals Ax [0] to Ax [7] in the network shown in FIG. 2 are respectively applied with the action potential $V_{pre}$ from seven neuron circuits 100 in a layer prior to the layer shown in FIG. 2. Also, the action potential $V_{pre}$ from the soma portions 110 respectively connected to the output terminals Nr [1] to Nr [7] are applied to the input terminals in a layer subsequent to the layer shown in FIG. 2.

Although the network shown in FIG. 2 is the fully-connected network, the network is not limited to this example. Also, the network shown in FIG. 2 includes seven inputs and seven outputs other than the input terminal Ax [0], the number of the inputs and outputs is not limited to this. The number of the inputs excluding the input terminal Ax [0] and the number of the outputs can be different from each other. Further, although each layer constituting the SNN can be similarly configured, the number of the inputs and outputs can be different in each layer.

More specifically, in the SNN shown in FIG. 2, each of the input terminals Ax [0] to Ax [7] is connected to each of the output terminals Nr [1] to Nr [7] via the ReRAMs. As explained above, the ReRAM at each intersection of the network constitutes the synapse portion 120 of each neuron circuit 100. Also, the output terminals Nr [1] to Nr [7] corresponds to the respective soma portions 110 of the neuron circuits 100. As explained with reference to FIG. 1, the neuron circuit 100 can include the soma portion 110 and the synapse portion(s) 120. Accordingly, in the network shown in FIG. 2, one neuron circuit 100 can include one soma portion 110 corresponding to the output terminal Nr [x] and eight synapse portions 120 (ReRAMs) respectively corresponding to the eight input terminals Ax [0] to Ax [7]. Taking the output terminal Nr [1] of FIG. 2 as an example, the neuron circuit 100 (the soma portion 110) corresponding to the output terminal Nr [1] includes eight synapse portions 120 (ReRAMs), namely: the synapse portion 120 (ReRAM) connected to the input terminal Ax [0]; the synapse portion 120 (ReRAM) connected to the input terminal Ax [1]; the synapse portion 120 (ReRAM) connected to the input terminal Ax [2]; the synapse portion 120 (ReRAM) connected to the input terminal Ax [3]; the synapse portion 120 (ReRAM) connected to the input terminal Ax [4]; the synapse portion 120 (ReRAM) connected to the input terminal Ax [5]; the synapse portion 120 (ReRAM) connected to the input terminal Ax [6]; and the synapse portion 120 (ReRAM) connected to the input terminal Ax [7]. Likewise, the other neuron circuits 100 respectively corresponding to the other output terminals Nr [2] to Nr [7] each include eight synapse portions 120 respectively corresponding to the eight input terminals Ax [0] to Ax [7].

Among the input terminals Ax [0] to Ax [7], the input terminals Ax [1] to Ax [7] are connected to each of the output terminals Nr [1] to Nr [7] via the ReRAMs as the synapse portions 120. As mentioned above, the weight w (conductance value of the ReRAM) of each synapse portion 120 is individually set. Accordingly, in response to the action potential $V_{pre}$ applied from the input terminal Ax [1], the output terminals Nr [1] to Nr [7] can output different charges $I_{post}$ because the conductance values of the ReRAMs connected to the input terminal Ax [1] can be different from each other. Also, the neuron potential of each soma portion 110 corresponding to one of the output terminals Nr [1] to Nr [7] takes a different value. The same applies to the action potential $V_{pre}$ from the other input terminals Ax [2] to Ax [7]. Thus, in response to the action potential $V_{pre}$ applied from the input terminals Ax [1] to Ax [7] during data processing, the soma portions 110 respectively corresponding the output terminals Nr [1] to Nr [7] can output the action potential $V_{pre}$ at different timings in accordance with the difference in the weight w (conductance value of the ReRAM) of the synapse portions 120.

Here, the weight w (conductance value of the ReRAM) of each synapse portion 120 can change as the action potential $V_{pre}$ is repeatedly applied from the input terminals Ax [1] to Ax [7]. This change in the weight w of each synapse portion 120 means learning in the network shown in the figure.

In the exemplary embodiment, among the input terminals Ax [0] to Ax [7], the additional input terminal Ax [0] is an input for monitoring the neuron potential. The input terminal Ax [0] is an example of a predetermined input terminal. Similarly to the other input terminals Ax [1] to Ax [7], the input terminal Ax [0] is connected to each of the output terminals Nr [1] to Nr [7] via the ReRAMs as the synapse portions 120. The weight w of each synapse portion 120 for the input terminal Ax [0] can be set to the same value (fixed value), and set lower than the weight w for the other input terminals Ax [1] to Ax [7] (for example, set to the minimum value that the synapse portion 120 can take). If the ReRAM is used for the synapse portion 120 as in the exemplary embodiment, the conductance value of the ReRAM connected to the input terminal Ax [0] can be set to the minimum value that the ReRAM can take.

The neuromorphic electric system in the exemplary embodiment is configured such that input signals fed to the input terminals Ax [0] to Ax [7] and the action potential $V_{pre}$ output from the neuron circuits 100 corresponding to the output terminals Nr [1] to Nr [7] can be monitored from the outside. With this configuration, the exemplary embodiment allows to monitor the neuron potential of each neuron circuit 100 from the outside, without adding a dedicated circuit for monitoring the neuron potential.

Here, the neuron circuit 100 can have one of the following two configurations, namely: (1) with the neuron potential initially set to zero, the neuron potential $V_{MEMBRANE}$ increases as the neuron circuit 100 receives the action potential $V_{pre}$, and the comparator 112 (see FIG. 1) outputs the action potential $V_{pre}$ (spike) once the neuron potential $V_{MEMBRANE}$ exceeds the threshold $V_{TH}$; (2) with the neuron potential initially set to the maximum, the neuron potential $V_{MEMBRANE}$ decreases as the neuron circuit 100 receives the action potential $V_{pre}$, and the comparator 112 outputs the action potential $V_{pre}$ (spike) once the neuron potential $V_{MEMBRANE}$ falls below the threshold $V_{TH}$. The former configuration is hereinafter referred to as a "charge type." The neuron circuit 100 explained with reference to FIG. 1 is assumed to have this configuration. The latter configuration is hereinafter referred to as a "discharge type." Hereinafter, the operation of the neuron circuit 100 according to the exemplary embodiment will be explained taking the discharge-type neuron circuit as an example.

According to the exemplary embodiment, the neuron potential of the neuron circuit 100 can be monitored by executing the following two phases. The first phase is a normal operation phase, in which test data is fed to the SNN to cause it to perform a normal operation. In the normal operation phase, the action potential $V_{pre}$ is applied to each neuron circuit 100 from the input terminals Ax [1] to Ax [7] in accordance with the operation of the SNN. The second phase is a monitoring phase, in which pulse signals (spikes) are fed to each neuron circuit 100 from the input terminal Ax [0] at regular intervals (at a fixed rate) to cause each neuron circuit 100 to fire. The time by which each neuron circuit 100 fires after entering the monitoring phase (i.e. the number of pulse signals multiplied by signal cycles) corresponds to the relative value of the neuron potential of each neuron circuit 100. Note that the relative value of the neuron potential of each neuron circuit 100 can be measured by the number of pulse signals alone.

Figure 3A:
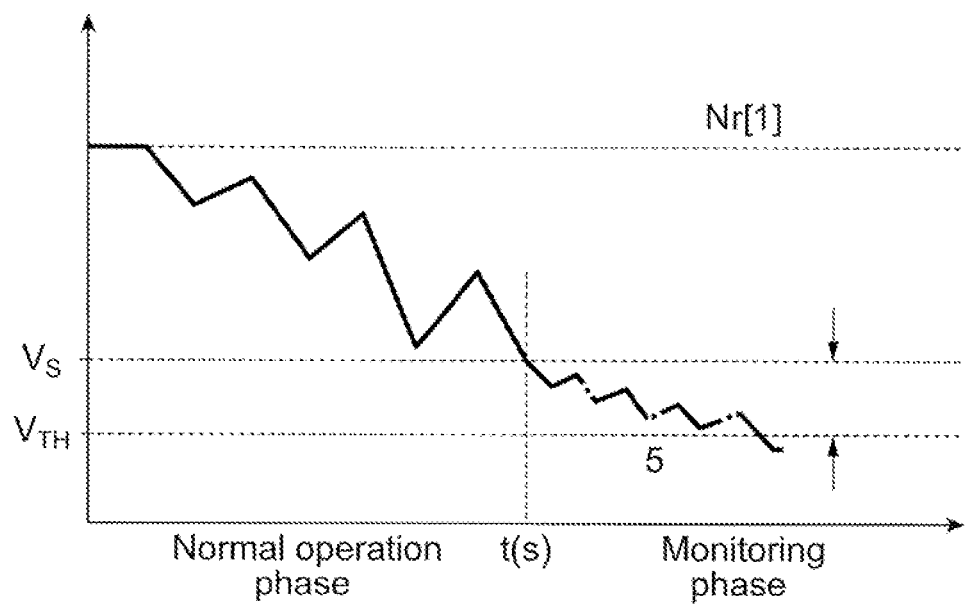
FIGS. 3A and 3B illustrate the change in the neuron potential of the neuron circuit in response to the input from input terminals.
Figure 3B:
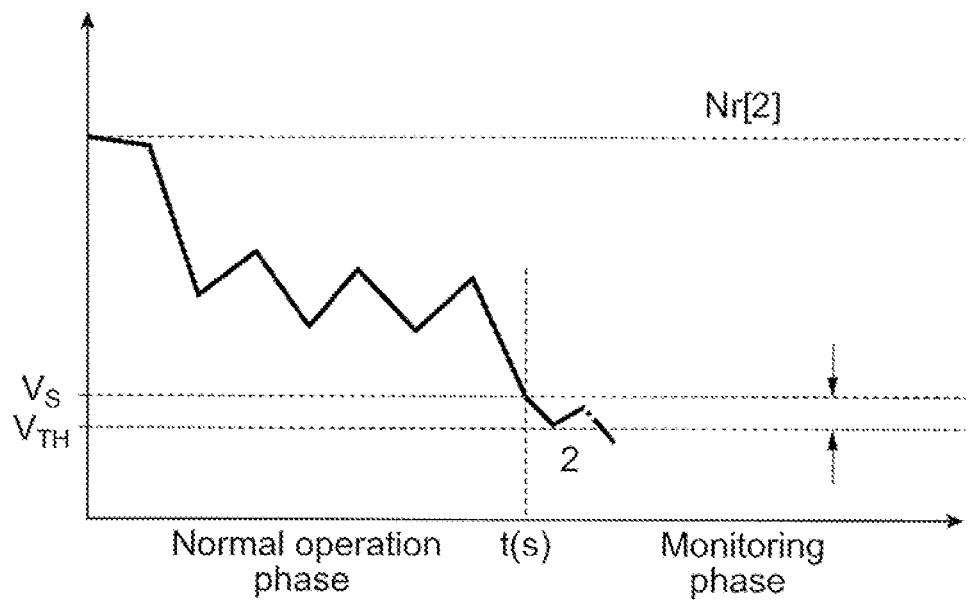

FIGS. 3A and 3B illustrate the change in the neuron potential of the neuron circuit 100 in response to the input from the input terminals Ax [0] to Ax [7]. FIG. 3A illustrates the neuron potential of the soma portion 110 of the neuron circuit 100 corresponding to the output terminal Nr [1]. FIG. 3B illustrates the neuron potential of the soma portion 110 of the neuron circuit 100 corresponding to the output terminal Nr [2].

In the examples shown in FIGS. 3A and 3B, the action potential $V_{pre}$ is applied several times in the normal operation phase, and then the phase changes to the monitoring phase at a time t(s). Referring to FIG. 3A, the soma portion 110 of the neuron circuit 100 corresponding to the output terminal Nr [1] fires with the input of five pulses after entering the monitoring phase at the time t(s). Referring to FIG. 3B, the soma portion 110 of the neuron circuit 100 corresponding to the output terminal Nr [2] fires with the input of two pulses after entering the monitoring phase at the time t(s). That is, at the time t(s), there is a difference of five pulses between the neuron potential $V_S$ of the neuron circuit 100 corresponding to the output terminal Nr [1] and the threshold V N. Likewise, at the time point t(s), there is a difference of two pulses between the neuron potential $V_S$ of the neuron circuit 100 corresponding to the output terminal Nr [2] and the threshold $V_{TH}$. In this manner, the exemplary embodiment allows to detect the neuron potential $V_S$ of each neuron circuit 100 at the start of the monitoring phase (the time t(s)) by measuring how many pulses are required to cause each neuron circuit 100 to fire. This enables to determine the state of each neuron circuit 100 when particular data (data input in the normal operation phase) is fed to the SNN.

As explained above, the weight w of each synapse portion 120 connected to the input terminal Ax [0] is set lower than the weight w of the synapse portions 120 connected to the other input terminals Ax [1] to Ax [7]. Here, as the weight w of the synapse portion 120 connected to the input terminal Ax [0] becomes lower, the number of pulses required to cause each neuron circuit 100 to fire in the monitoring phase increases; in other words, the read-out resolution of the neuron potential in the monitoring phase becomes higher, which leads to higher accuracy in monitoring the neuron potential of each neuron circuit 100. Therefore, the weight w of each synapse portion 120 connected to the input terminal Ax [0] is set as low as possible.

As shown in FIGS. 3A and 3B, the neuron potential of the neuron circuit 100 is not decreasing simply in response to the applied action potential $V_{pre}$ but gradually decreasing overall while repeating an increase and a decrease. This reflects the leak of charge in the leaky integrate-and-fire (LIF) model. As explained above, the neuron circuit 100 is configured such that the neuron potential $V_{MEMBRANE}$ of the neuron circuit 100 changes from its initial value toward the threshold $V_{TH}$ every time the action potential $V_{pre}$ is applied from the prior neuron circuit 100. In the LIF model, however, the neuron potential $V_{MEMBRANE}$ of the neuron circuit 100 gradually returns to its initial value without the action potential $V_{pre}$ applied from the prior neuron circuit 100, instead of maintaining its last value, due to the intended leak of charge (the leak function). Since the examples shown in FIGS. 3A and 3B assume the use of the discharge-type neuron circuit 100, the neuron potential of the neuron circuit 100 decreases by the applied action potential $V_{pre}$ while the neuron potential increases due to the leak of charge. In contrast, with the use of a charge-type neuron circuit 100, the neuron potential of the neuron circuit 100 increases by the applied action potential $V_{pre}$ while the neuron potential decreases due to the leak of charge. This leak of charge represents the phenomenon observed in neurons in biological nervous systems.

The weight w of each synapse portion 120 connected to the input terminal Ax [0] is set as low as possible, as mentioned above. In the LIF model with the intended leak of charge, however, the amount of change in the neuron potential by the input of one pulse needs to exceed the amount of return of the neuron potential between the pulse inputs. Accordingly, the weight w of each synapse portion 120 connected to the input terminal Ax [0] is set as low as possible within the range satisfying this condition.

This leak function in the neuron circuit 100 can be implemented by, for example, providing a circuit (e.g. a field effect transistor (FET)) that moves the neuron potential at a constant rate toward a direction opposite to the direction in which the neuron potential moves by the applied action potential $V_{pre}$. In the case of the discharge-type neuron circuit 100, a circuit to charge the capacitor 111 of the soma portion 110 can be provided. In the case of the charge-type neuron circuit 100, a circuit to discharge the capacitor 111 in the soma portion 110 can be provided.

As mentioned above, this leak of charge is intended to represent the phenomenon in neurons in biological nervous systems. Accordingly, the return of the potential due to the leak of charge is not necessary for the operation of the neuron circuit 100 in the monitoring phase. Thus, a switch can be further provided to turn on and off the leak function, and the leak function can be turned off when the phase changes to the monitoring phase. This configuration allows to set the weight w of each synapse portion 120 connected to the input terminal Ax [0] as low as possible, without the need for taking into account the return of the potential due to the leak of charge.

The operation of the neuron circuit 100 according to the exemplary embodiment will be explained in detail using an example where predetermined test data (test data) is fed to the SNN of the neuron circuits 100 shown in FIG. 2.

FIGS. 4A thru 4D illustrate a relationship of the input pattern fed to the input terminals Ax [0] to Ax [7] and the neuron potential $V_{MEMBRANE}$ of the neuron circuit 100. FIG. 4A shows an input pattern of the action potential $V_{pre}$ fed to the input terminals Ax [1] to Ax [7] in the normal operation phase, and an input pattern of the pulse signals fed to the input terminals Ax [0] in the monitoring phase. FIG. 4B shows the change in the neuron potential of the neuron circuit 100 corresponding to the output terminal Nr [1] in response to the input of the input pattern shown in FIG. 4A. FIG. 4C shows the change in the neuron potential of the neuron circuit 100 corresponding to the output terminal Nr [2] in response to the input of the input pattern shown in FIG. 4A. FIG. 4D shows the change in the neuron potential of the neuron circuit 100 corresponding to the output terminal Nr [3] in response to the input of the input pattern shown in FIG. 4A.

In FIG. 4A, the vertical axis indicates the input terminals Ax [0] to Ax [7] and the horizontal axis indicates time. The period from the time t(0) to the time t(40) corresponds to the normal operation phase while the period on and after the time t(41) corresponds to the monitoring phase. With the operation shown in FIGS. 4A to 4D, the neuron potential of each neuron circuit 100 until the time t(40) can be monitored. In the normal operation phase, the action potential $V_{pre}$ based on a given pattern is applied to the input terminals Ax [1] to Ax [7]. In the monitoring phase, a series of pulse signals is fed to the input terminal Ax [0] at regular intervals.

In FIG. 4A, a dot is marked at each intersection where the action potential $V_{pre}$ is applied to each of the input terminals Ax [1] to Ax [7] at the time t(n). For example, at the time t(2), the action potential $V_{pre}$ is applied to the input terminals Ax[1], Ax[5] and Ax[6]. At the time t(3), the action potential $V_{pre}$ is applied to the input terminals Ax[1], Ax[4] and Ax[7]. At the times t(13) and t(16), the action potential $V_{pre}$ is applied to all of the input terminals Ax [1] to Ax [7]. On the other hand, at the times t(1), t(6) and t(11), the action potential $V_{pre}$ is not applied to any of the input terminals Ax [1] to Ax [7].

In the monitoring phase, pulse signals are only fed to the input terminal Ax [0]. Accordingly, dots are marked only at the intersections of the input terminal Ax [0] and the time t(n) on and after the time t(41).

In each of FIGS. 4B thru 4D, the vertical axis indicates the change in the neuron potential $V_{MEMBRANE}$. The horizontal axis indicates the time corresponding to the time shown in FIG. 4A. In the examples shown in FIGS. 4B thru 4D, the neuron potential is gradually decreasing overall while repeating increase and decrease in the normal operation phase due to the leak of charge. In the monitoring phase, where the leak function is turned off, the neuron potential is simply decreasing.

As shown in FIG. 4B, the neuron circuit 100 corresponding to the output terminal Nr [1] fires with the input of five pulses after entering the monitoring phase. Then, the neuron potential $V_{MEMBRANE}$ of the neuron circuit 100 returns to its maximum value at the time t(46). As shown in FIG. 4C, the neuron circuit 100 corresponding to the output terminal Nr [2] fires with the input of 12 pulses after entering the monitoring phase. Then, the neuron potential $V_{MEMBRANE}$ of the neuron circuit 100 returns to its maximum value at the time t(53). As shown in FIG. 4D, the neuron circuit 100 corresponding to the output terminal Nr [3] fires with the input of two pulses after entering the monitoring phase. Then, the neuron potential $V_{MEMBRANE}$ of the neuron circuit 100 returns to its maximum value at the time t(43).

As shown in FIGS. 4B thru 4D, the neuron potential of each neuron circuit 100 changes differently from each other in response to the input of the input pattern (the same input pattern) shown in FIG. 4A. As a result, at the time t(41) i.e. when the phase changes from the normal operation phase to the monitoring phase, the neuron potential $V_{MEMBRANE}$ of each neuron circuit 100 differs from each other, as shown in FIGS. 4B thru 4D. This is because the weight w of the synapse portion 120 of each neuron circuit 100 is individually set.

Although the phase changes at the time t(41) in the examples shown in FIGS. 4A thru 4D, the phase change can be at any desired timing to monitor the neuron potential of each neuron circuit 100. For example, in order to monitor the neuron potential of each neuron circuit 100 in response to the input until the time t(36) in the normal operation phase, the phase change can be set at the time t(37). Note that, after the phase change at the time t(37), the neuron potential of each neuron circuit 100 changes in accordance with the pulse signals in the monitoring phase. Accordingly, it cannot be possible to monitor the neuron potential of each neuron circuit 100 in response to the input until the time t(40) after the phase change at the time t(37). Thus, in order to monitor the neuron potential of each neuron circuit 100 in response to the input until the time t(40), the operation in the normal operation phase needs to be newly performed from the time t(1).

While the examples shown in FIGS. 3A thru 3B and FIGS. 4A thru 4D assume the use of the discharge-type neuron circuit 100, the above operation can also be applicable to the charge-type neuron circuit 100, allowing to monitor the neuron potential of such neuron circuit 100 at any desired timing.

As explained above, this exemplary embodiment allows to monitor the neuron potential (relative value) of each neuron circuit 100 in response to the action potential $V_{pre}$ of a given pattern in the normal operation phase. This can be achieved by employing the input terminal Ax [0] for monitoring and the ReRAM as the synapse portion 120 connected to the input terminal Ax [0], as explained with reference to FIG. 2. Such input terminal Ax [0] and ReRAM can be implemented using a part of the existing input terminals and ReRAMs in the SNN. Accordingly, this exemplary embodiment does not require a dedicated circuit for monitoring the neuron potential to be installed in each neuron circuit 100 in order to monitor the neuron potential.

Also, assume the case where a classification task on temporal data is to be executed and the neuron circuits 100 corresponding to the classes are prepared as many as the number of classes. In this case, the monitored neuron potential of each neuron circuit 100 can be used as a probability of whether the temporal data read by the SNN belongs to each class, according to the exemplary embodiment.

In the exemplary embodiment, the ReRAM is used as the synapse portion 120 of the neuron circuit. However, other resistor elements can be used as the synapse portion 120 as long as the element can have an analog value (multi-value) as a conductance value (resistance value) and the conductance value can be variable. For example, a magnetoresistive random access memory (MRAM) or a phase change random access memory (PCM) can be used.

Figure 5:
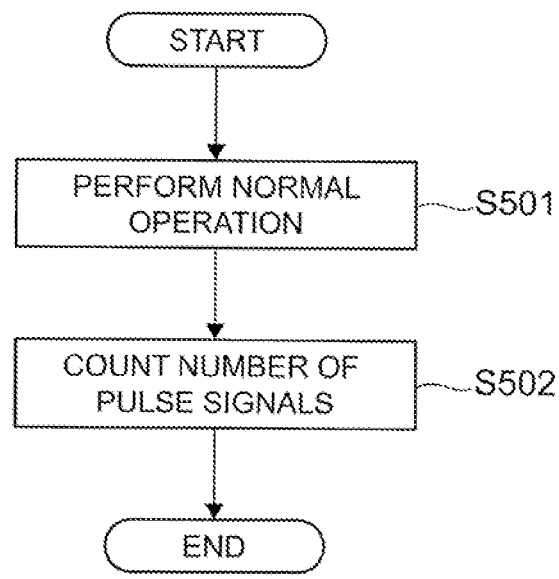
FIG. 5 is a flowchart of a method for monitoring the neuron potential (relative value) according to the exemplary embodiment.

FIG. 5 is a flowchart depicting a method for monitoring the neuron potential (relative value) according to the exemplary embodiment.

To monitor the neuron potential according the exemplary embodiment, test data is first fed to the SNN to cause it to perform the normal operation (step 501). That is, the operation in the normal operation phase is performed.

Next, a series of pulse signals are fed at regular intervals to the input terminal Ax [0] for monitoring. That is, the operation in the monitoring phase is performed. In this monitoring phase, the number of pulse signals at the time when each neuron circuit 100 fires is counted (determined) (step 502). Note that the pulse signals in the monitoring phase are fed to each layer in the SNN individually. The pulse signals can be fed only to the layer including target neuron circuits 100 whose neuron potential is to be monitored.

In the above exemplary embodiment, the synapse portion 120 for the input terminal Ax [0] has the same configuration as the other synapse portions 120 for the other input terminals Ax [1] to Ax [7]. Specifically, the ReRAM is used for each synapse portion 120 for the input terminals Ax [0] to Ax [7] in the above exemplary embodiment. As an alternative embodiment, the synapse portion 120 for the input terminal Ax [0] can be configured differently from the other synapse portions 120 for the other input terminals Ax [1] to Ax [7].

Figure 6:
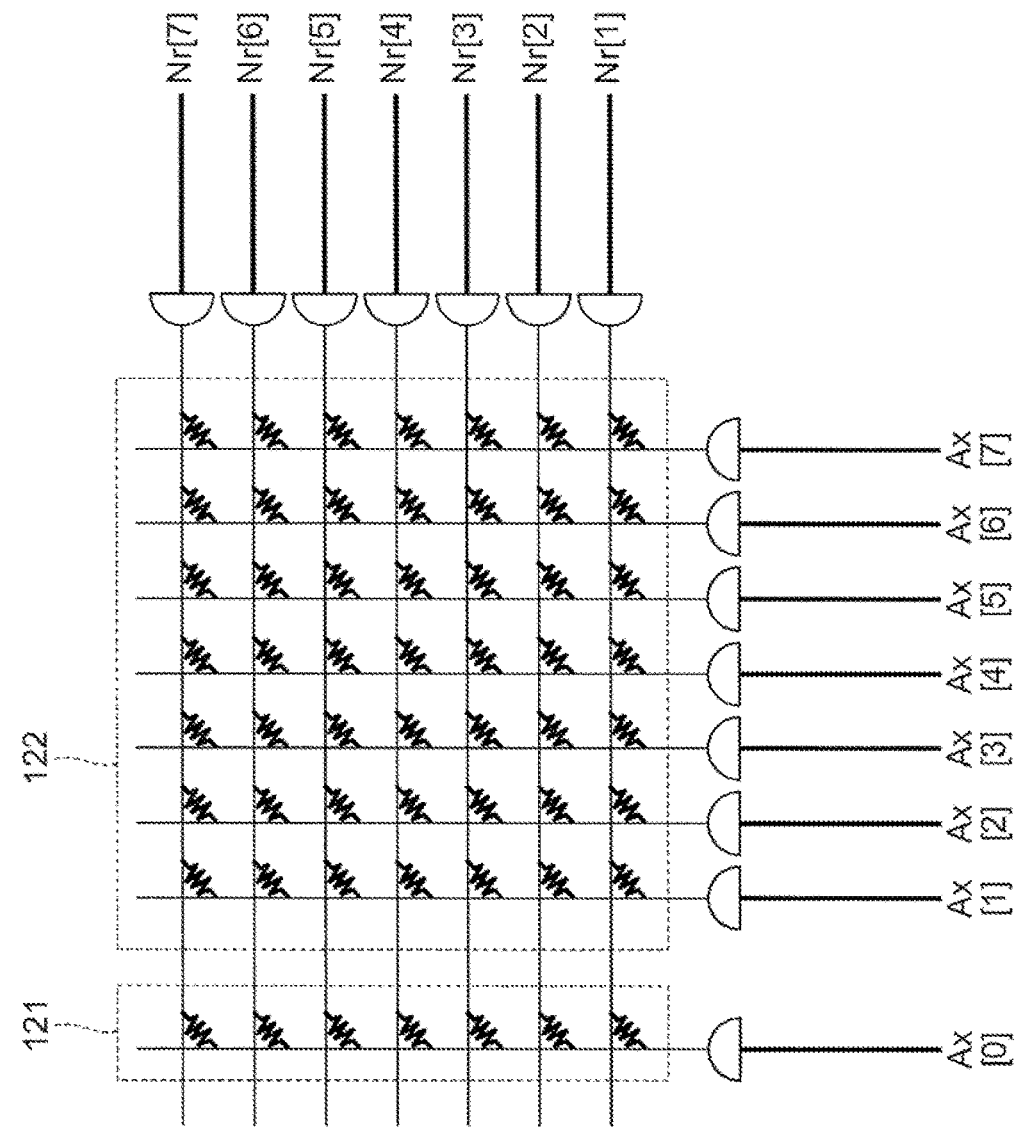
FIG. 6 illustrates an example of the configuration of the spiking neural network (SNN) of the neuron circuits according to an alternative embodiment.

FIG. 6 illustrates an example of the configuration of the spiking neural network (SNN) of the neuron circuits 100 according to the alternative embodiment.

As described above, the weight w of each synapse portion 120 for the input terminal Ax [0] is a fixed value. Thus, the alternative embodiment shown in FIG. 6 can employ a resistor element having a fixed conductance value (resistance value) as the synapse portion 120 of each neuron circuit 100 for the input terminal Ax [0]. Examples of such resistor element include a CMOS resistor element (e.g. polysilicon resistor).

In FIG. 6, seven resistor elements constitute a resistor element group 121 connected to the input terminal Ax [0]. These resistor elements can be CMOS resistor elements having the same fixed conductance value (resistance value). On the other hand, 49 resistor elements constitute a resistor element group 122 connected to the other input terminals Ax [1] to Ax [7]. These resistor elements can be ReRAMs each having an individually variable conductance value (resistance value). In the alternative embodiment, the configurations other than the synapse portions 120 for the input terminal Ax [0] are the same as those in the above exemplary embodiment explained with reference to the figures, e.g. FIG. 2.

In the alternative embodiment, the synapse portions 120 for the input terminal Ax [0] are different from the synapse portions 120 for the other input terminals Ax [1] to Ax [7]. Accordingly, the synapse portions 120 for the input terminal Ax [0] cannot be implemented using a part of the input terminals and the ReRAMs already existing in the SNN, unlike the above exemplary embodiment. In other words, the alternative embodiment provides an additional input terminal Ax [0] and additional synapse portions 120 for the input terminal Ax [0] to the SNN. Even so, this alternative embodiment allows to monitor the neuron potential (relative value) of each neuron circuit 100 with a simple configuration, as compared to adding a dedicated circuit for monitoring the charge stored in the comparator 112 of each neuron circuit 100 from the outside.

In the above embodiments, a resistor element is used as the synapse portion 120. However, the configuration of the synapse portion 120 is not limited to this. The synapse portion 120 can be any other element as long as the synapse portion 120 can supply a predetermined amount of charge to the soma portion 110 in response to the input of spike signals or monitoring pulse signals from the prior neuron circuit 100. For example, the synapse portion 120 can be a capacitor that stores the charge according to the signals fed to the capacitor and supplies the stored charge to the soma portion 110.

Although each resistor element in FIGS. 2 and 6 is directly connected between the input terminal Ax[x] and the output terminal Nr[y], the connection is not limited to this. For example, a transistor (e.g. a field effect transistor (FET)) or a diode can be used as an access device.

What is claimed is:

1. A neuromorphic electric system comprising a network of a plurality of neuron circuits, the plurality of neuron circuits being connected in series and in parallel to form a plurality of layers, wherein each of the plurality of neuron circuits includes:
 a soma circuit configured to store a charge supplied thereto and to output a spike signal if a neuron potential of the soma circuit caused by the stored charge exceeds a predetermined threshold; and
 a plurality of synapse circuits each configured to supply a charge to the soma circuit according to a spike signal fed to the synapse circuits, a number of the plurality of synapse circuits being one more than a plurality of neuron circuits in a prior layer that output the spike signal to the synapse circuits, with one of the plurality of synapse circuits being a control circuit,
the control circuit is configured to supply a charge to the soma circuit in response to receiving a series of pulse signals and has a same resistance value as control circuits in each of the plurality of neurons, and
the others of the plurality of synapse circuits are configured to supply a charge to the soma circuit in response to receiving a spike signal from respective corresponding neuron circuits in the prior layer.

2. The neuromorphic electric system of claim 1, wherein at least one of the plurality of synapse circuits is a variable resistor element capable of holding a resistance value set to the resistor element.

3. The neuromorphic electric system of claim 2, wherein at least one of the plurality of synapse circuits is a resistive random access memory (ReRAM).

4. The neuromorphic electric system of claim 2, wherein the series of pulse signals are received at regular intervals.

5. The neuromorphic electric system of claim 2, wherein the variable resistor element constituting the control circuit in each neuron circuit in at least one of the plurality of layers has a highest resistance value among the variable resistor elements constituting the plurality of synapse circuits in each neuron circuit in the at least one of the plurality of layers, wherein the series of pulse signals are received at regular intervals.

6. The neuromorphic electric system of claim 1, wherein the control circuit in each neuron circuit in at least one of the plurality of layers supplies a same amount of charge to the soma circuit in response to receiving a signal of a same potential, wherein the series of pulse signals are received at regular intervals.

7. The neuromorphic electric system of claim 1, wherein the control circuit in each neuron circuit in at least one of the plurality of layers supplies a lowest charge to the soma circuit among the plurality of synapse circuits in each neuron circuit in the at least one of the plurality of layers, in response to receiving a signal of a same potential, wherein the series of pulse signals are received at regular intervals.

8. A neuromorphic electric system comprising a network of a plurality of layers each including a plurality of input terminals and a plurality of output terminals, wherein each of the plurality of layers is a network in which the plurality of input terminals and the plurality of output terminals are connected to each other via a plurality of resistor elements,
the plurality of input terminals include a plurality of general input terminals and one predetermined input terminal, the plurality of general input terminals receiving input from respective corresponding output terminals in a prior layer, the predetermined input terminal being unconnected to any one of the plurality of output terminals in the prior layer,
the predetermined input terminal receives input of a series of pulse signals with resistor elements connected to the predetermined input terminal have a same resistance value, and
each of the plurality of output terminals is connected to a circuit that stores a charge obtained from input from the plurality of input terminals via the plurality of resistor elements, the circuit outputting a spike signal to a subsequent layer as an output from a layer the circuit belongs to, if a neuron potential of the circuit caused by the stored charge exceeds a predetermined threshold.

9. The neuromorphic electric system of claim 8, wherein, among the plurality of resistor elements, resistor elements connected to the predetermined input terminal have a highest resistance value among the plurality of resistor elements included in the network.

* * * * *